H. V. S. TAYLOR.
MEASURING INSTRUMENT.
APPLICATION FILED AUG. 3, 1917.
1,300,513.
Patented Apr. 15, 1919.
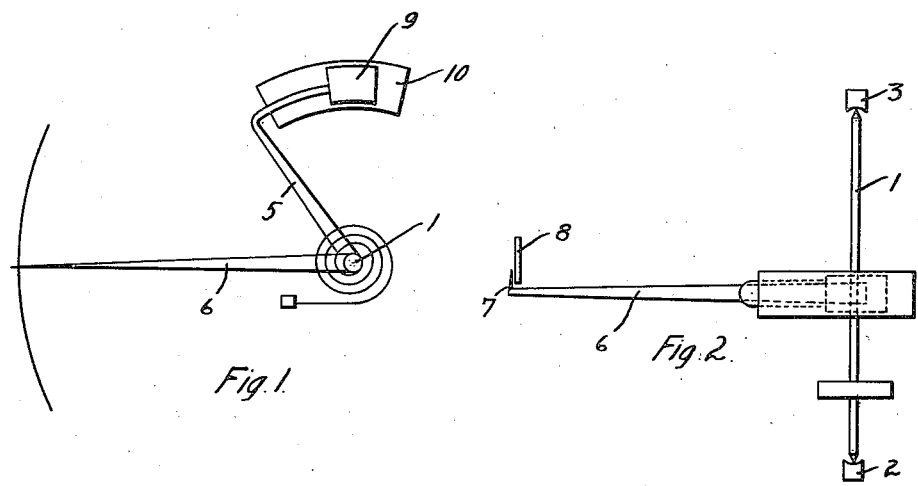
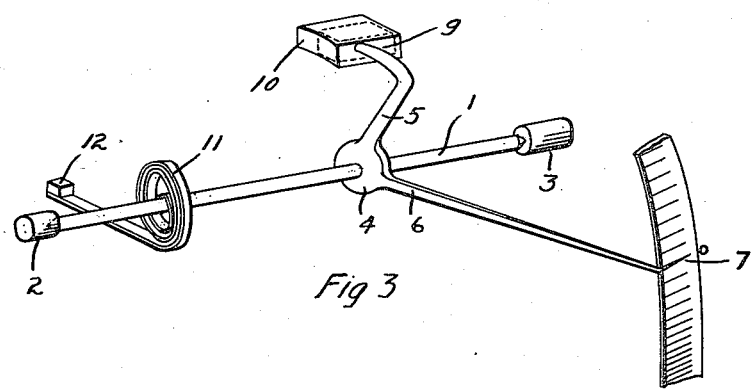
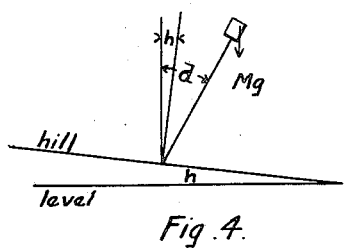
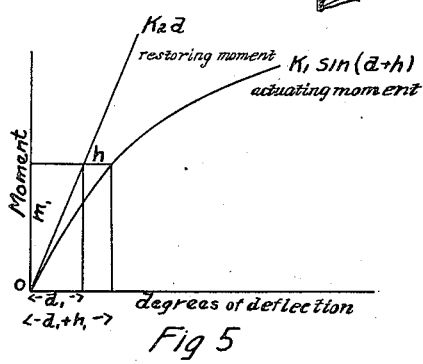
WITNESSES:
INVENTOR
Horace V. S. Taylor
BY
ATTORNEY

UNITED STATES PATENT OFFICE.

HORACE V. S. TAYLOR, OF WILKINSBURG, PENNSYLVANIA, ASSIGNOR TO WESTINGHOUSE ELECTRIC & MANUFACTURING COMPANY, A CORPORATION OF PENNSYLVANIA.

MEASURING INSTRUMENT.

1,300,513.   Specification of Letters Patent.   Patented Apr. 15, 1919.

Application filed August 3, 1917. Serial No. 184,228.

*To all whom it may concern:*

Be it known that I, HORACE V. S. TAYLOR, a citizen of the United States, and a resident of Wilkinsburg, in the county of Allegheny and State of Pennsylvania, have invented a new and useful Improvement in Measuring Instruments, of which the following is a specification.

My invention relates to measuring instruments and particularly to accelerometers and grade-indicating instruments that are employed on vehicles.

One object of my invention is to provide an instrument of the above indicated character that shall have a scale the divisions of which are substantially directly proportional to the value to be measured between predetermined limits and of another and less proportion between all other limits.

Another object of my invention is to provide a device of the above indicated character that shall be simple in design, inexpensive to construct and accurate in its operation.

In practising my invention, I provide a substantially horizontal shaft, a pointer therefor and a weight member attached to the shaft and disposed at such a position above the same that the center of gravity of the shaft, the weight member and the pointer is above the shaft in a vertical plane passing through the same. A spring is connected to the shaft for restoring the same and is so proportioned that it shall coöperate with the weight member to cause the pointer to be deflected substantially in direct proportion to the rate of acceleration or the per cent. grade being traversed between predetermined normal limits and another and less proportion between other limits. Thus, a convenient scale having relatively wider limits of operation may be obtained.

Figure 1 of the accompanying drawings is a side elevational view of a measuring instrument embodying my invention; Fig. 2 is a top plan view of the instrument shown in Fig. 1; Fig. 3 is a perspective view of the instrument shown in Figs. 1 and 2, and Figs. 4 and 5 are diagrams illustrating the coöperation of the various elements embodied in the instrument shown in Figs. 1, 2 and 3.

A shaft 1 is mounted in a horizontal plane and is supported by bearing members 2 and 3. A member 4 having two arms 5 and 6 is mounted on the shaft 1 and is so placed with respect thereto that the arm 5 is disposed above the shaft 1 and the arm 6 at one side thereof. The arm 6 is provided with a pointer 7, at one end thereof, that is adapted to coöperate with a scale 8. The arm 5 has an enlarged weight member or portion 9 at its outer end that is adapted to move in a damping receptacle 10. One end of a spring 11 is connected to the shaft 1 and the other end is connected to a stationary member 12. The spring 11 is adapted to normally hold the members 1, 5 and 6 in such position that the center of gravity of the system is above the shaft in a vertical plane passing through the same.

When the vehicle (not shown) upon which the instrument is mounted is moved up or down a hill, as shown in Fig. 4 of the drawings, the instrument will be tipped at an angle $h$ corresponding to the grade of the hill. This will cause the weight member 9 to fall forward through an angle $d$ from its zero position. However, when the member 9 falls to this position there are two moments acting upon the shaft 1 one of which is the actuating moment of gravity that is equal to the mass $m$ of the member 9 multiplied by the force $g$ of gravity, multiplied by the product of the distance $l$ between the center of the shaft 1 and the member 9 and the sine of the angle $h+d$, or in other words, $m.g.l.$ sine $(h+d)$ which may be written $k_1$ sine $(h+d)$, where $m.g.l.$ equals $k_1$. The restoring moment is caused by the deflection of the spring through the angle $d$ and its moment is $d \times k_2$. As these two moments are equal and opposite, we have the equation $k_1$. sine $(h+d) = k_2.d$.

Fig. 5 of the drawings illustrates the deflection, for any moment, such as $m_1$ for different grades $h$. The horizontal space between the two curves, such as the distance $h$ in Fig. 5, is, therefore, the value of the angle $h$ that will give a deflection $d$. From the foregoing, it will be noted that, for small angles $h$, the deflection $d$ will be substantially proportional to $h$, whereas, for larger angles, $d$ increases a little more slowly than $h$. This has the effect that, on scale 8, the deflections are equally spaced for small angles but are somewhat crowded at the outer end. This permits a relatively open scale for readings on ordinary hills, whereas, for steep grades and accelerations or retardations, the scale will not be unduly distended. The line $ok_2d$ represents the restoring moment and the line $ok_1$ sine $(d+h)$ the actuating moment of the shaft.

The slope of the line $ok_2d$ in Fig. 5 of the drawings may be changed by changing the strength of the spring 11 and, in this manner, we may obtain any amount of magnification of angle $h$ that we desire. In other words, by varying the strength of the spring and mounting the member 9 above the shaft 11, any desired magnification of the angle of deflection may be obtained without resorting to complicated systems of levers.

I do not limit my invention to the particular structure illustrated, as it may be variously modified without departing from the spirit and scope of the invention as set forth in the appended claims.

I claim as my invention:

1. An accelerometer comprising a rotatable member, a pointer mounted thereon, a weight member operatively connected to the rotatable member, and a spring for restraining the movement of the rotatable member, the center of gravity of the weight member, the pointer, and the rotatable member being normally in a vertical plane above the rotatable member.

2. A measuring instrument comprising a shaft, a weight member and a pointer mounted on said shaft, and a spring for yieldingly restraining the shaft in such normal position that the center of gravity of the shaft, the weight member and the pointer is above, and in a vertical plane passing through, the shaft.

3. A measuring instrument comprising a shaft, a weight member and a pointer mounted on said shaft, and a spring for yieldingly restraining the shaft in such normal position that the center of gravity of the shaft, the weight member and the pointer lies in a vertical plane above the shaft.

4. A measuring instrument comprising a rotatable member, an arm having an enlarged portion at one end mounted thereon, and a spring for opposing the movement of the rotatable member, the center of gravity of the rotatable member and the arm being directly above the rotatable member.

5. A grade-indicating instrument comprising a substantially horizontally-disposed rotatable member, a pointer mounted thereon, a scale for the pointer, a weight member mounted in a substantially vertical position on and above the rotatable member, and a spring for so opposing the movement of the weight member that the deflections of the pointer are substantially proportional to the grade to be measured, between predetermined limits.

6. A grade-indicating instrument comprising a horizontally-disposed shaft, a vertically-disposed weight member mounted on the upper side of the shaft, a pointer for the shaft, and means for opposing the movement of the shaft.

7. A grade-indicating instrument comprising a substantially horizontally-disposed rotatable shaft, a pointer therefor, a scale for the pointer, a weight member mounted in a vertical position on the upper side of the shaft, and means for so opposing the movement of the weight member that the deflections of the pointer are substantially proportional to the grade to be measured, between predetermined limits.

8. A grade-indicating instrument comprising a rotatable member, gravity-actuated means mounted on the upper side of and tending to turn the rotatable member in one direction, and means for so opposing the gravity-actuated means that the rotatable member shall be moved substantially in proportion to the grade to be measured, between predetermined limits, and another and less porportion between all other limits.

In testimony whereof, I have hereunto subscribed my name this 20th day of July, 1917.

HORACE V. S. TAYLOR.